United States Patent
Staigl, III et al.

(10) Patent No.: US 6,882,070 B2
(45) Date of Patent: Apr. 19, 2005

(54) ELECTRIC MOTOR HAVING A TERMINAL BOARD

(75) Inventors: Frank Edward Staigl, III, Greenville, OH (US); Chih Min Lin, Tipp City, OH (US); William James Watkins, Tipp City, OH (US)

(73) Assignee: A. O. Smith Corporation, Milwaukee, WI (US)

( * ) Notice: Subject to any disclaimer, the term of this patent is extended or adjusted under 35 U.S.C. 154(b) by 0 days.

(21) Appl. No.: 10/249,326

(22) Filed: Apr. 1, 2003

(65) Prior Publication Data

US 2004/0195923 A1 Oct. 7, 2004

(51) Int. Cl.$^7$ ............................................. H02K 11/00
(52) U.S. Cl. ......................... 310/71; 310/89; 310/184; 310/68 R; 310/68 A; 200/11 R; 200/11 TC
(58) Field of Search ............................ 310/71, 89, 254, 310/184, 180, 68 R, 68 A; 200/43.04, 43.08, 11 R, 11 TC

(56) References Cited

U.S. PATENT DOCUMENTS

| | | | |
|---|---|---|---|
| 1,909,497 A | * | 5/1933 | Nielsen ........................ 310/71 |
| 2,619,621 A | * | 11/1952 | Brown ........................ 318/753 |
| 3,231,767 A | | 1/1966 | Powell |
| 3,384,729 A | | 5/1968 | Burris, Jr. et al. |
| 3,652,812 A | | 3/1972 | Ristuccia |
| 3,719,163 A | | 3/1973 | Jedynak et al. |
| 3,767,880 A | | 10/1973 | Austin |
| 3,831,125 A | | 8/1974 | Brundage et al. |
| 3,983,428 A | | 9/1976 | Bitsch et al. |
| 4,038,574 A | * | 7/1977 | Crow et al. .................... 310/71 |
| 4,131,033 A | * | 12/1978 | Wright et al. ................. 74/553 |
| 4,167,658 A | | 9/1979 | Sherman |
| 4,406,933 A | | 9/1983 | Boozer |
| 4,559,419 A | | 12/1985 | Overman et al. |
| 4,593,163 A | | 6/1986 | Fisher |
| 4,748,355 A | | 5/1988 | Anderson et al. |
| D297,726 S | | 9/1988 | Araki |
| 4,775,766 A | | 10/1988 | Kooy et al. |
| 4,937,482 A | | 6/1990 | Dohogne |
| 5,245,143 A | | 9/1993 | James et al. |
| 5,245,237 A | | 9/1993 | Fisher et al. |
| 5,430,931 A | | 7/1995 | Fisher et al. |
| 5,543,671 A | | 8/1996 | Williams |
| 5,593,022 A | | 1/1997 | Schaeffer et al. |
| 5,966,995 A | | 10/1999 | Edwards, Jr. et al. |
| 6,040,646 A | * | 3/2000 | Peters .......................... 310/71 |
| 6,048,219 A | | 4/2000 | Kotowski |
| 6,133,658 A | | 10/2000 | Fisher et al. |
| 6,479,913 B1 | | 11/2002 | Lin |

* cited by examiner

*Primary Examiner*—Thanh Lam
*Assistant Examiner*—David W. Scheuermann
(74) *Attorney, Agent, or Firm*—Michael Best & Friedrich LLP

(57) ABSTRACT

An electric motor including having a housing, a stator fixed relative to the housing, a shaft rotatable about a motor axis, a rotor supported by the shaft for rotation with the shaft relative to the stator, a terminal board fixed relative to the housing, and first and second electrical terminals supported by the terminal board. The electric motor also includes an operating condition selection device including a moveable portion supported by the terminal board for pivotable rotation about a second axis between a first position corresponding to a first operating condition and a second position corresponding to a second operating condition. At least a portion of the moveable portion substantially remains in a fixed axial position relative to the second axis while pivoting between the first and second positions. The electrical terminals are accessible through a conduit receiving aperture for testing purposes.

18 Claims, 7 Drawing Sheets

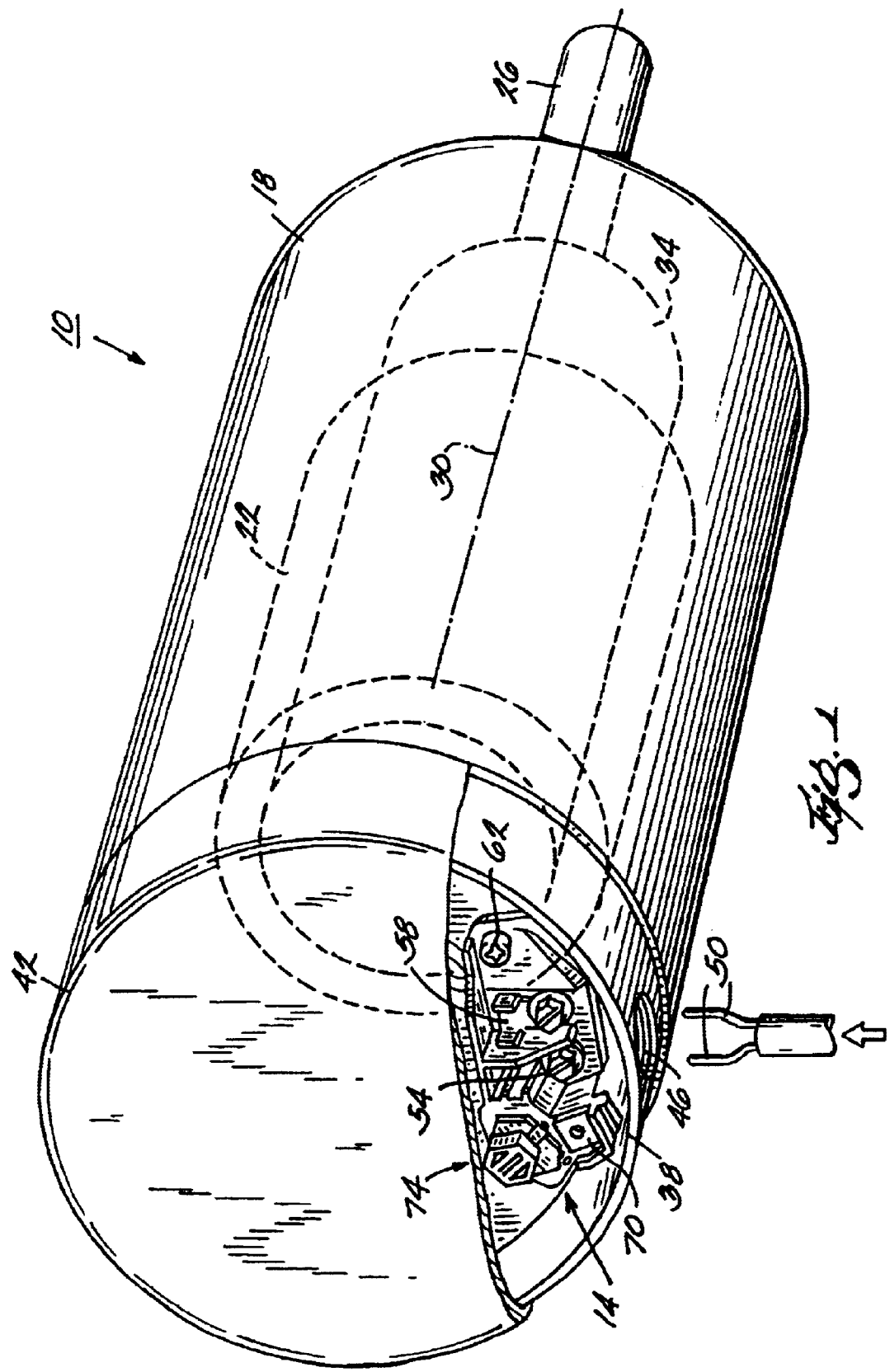

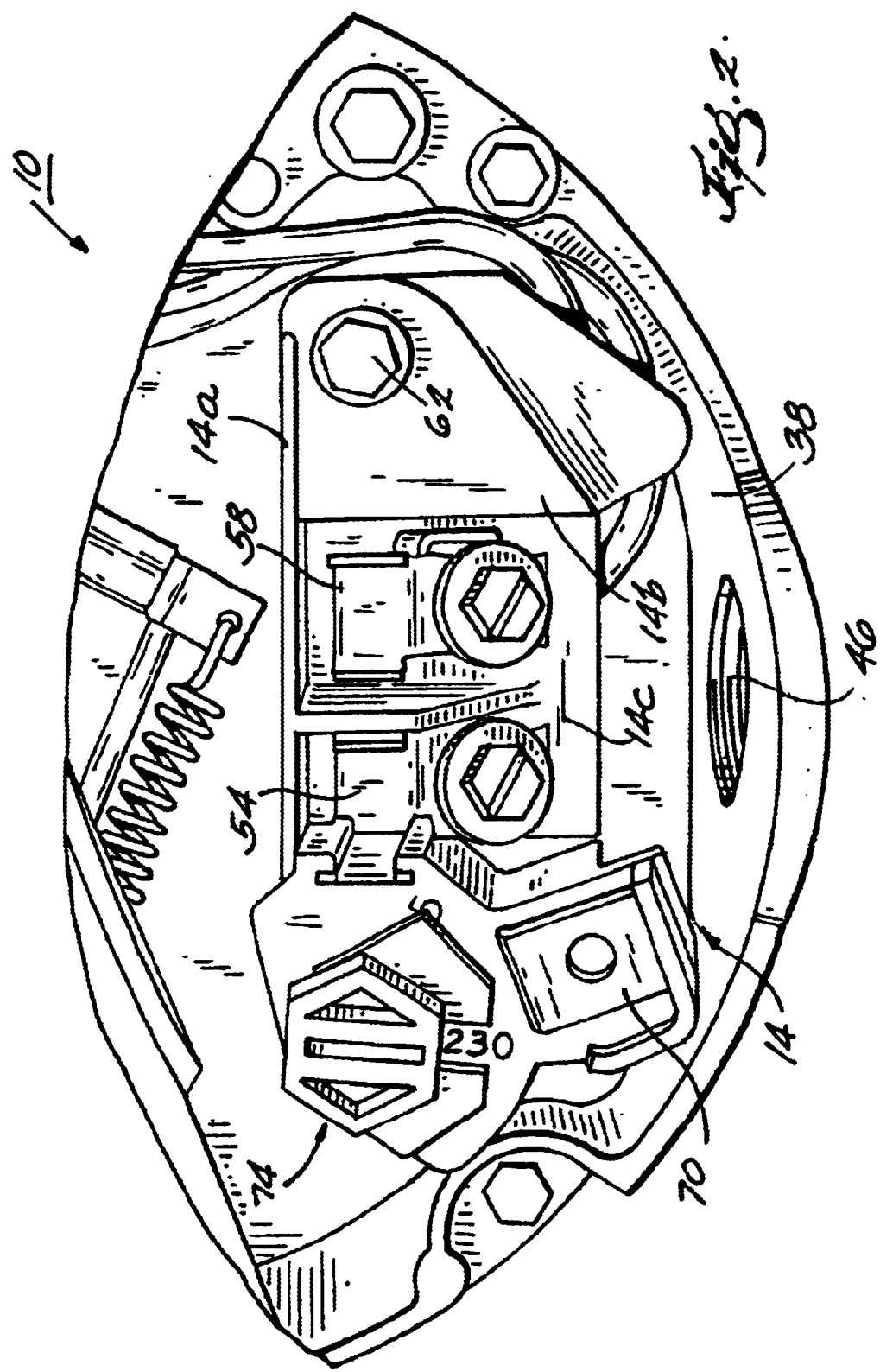

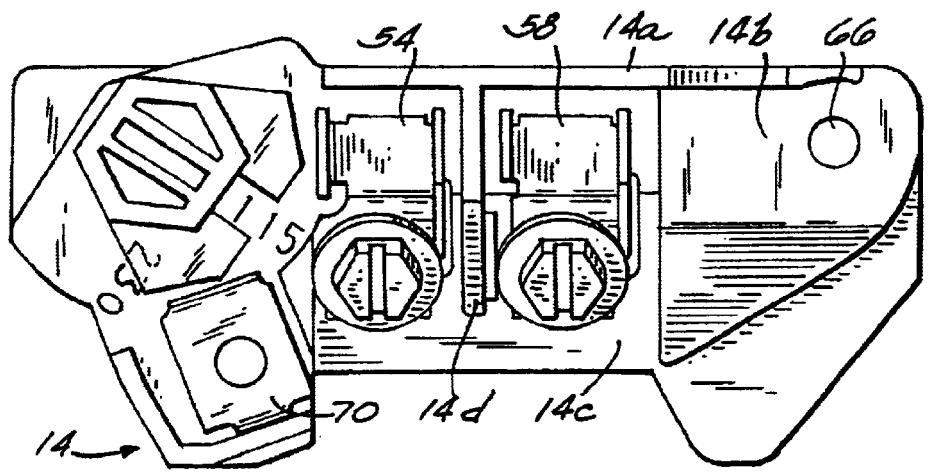
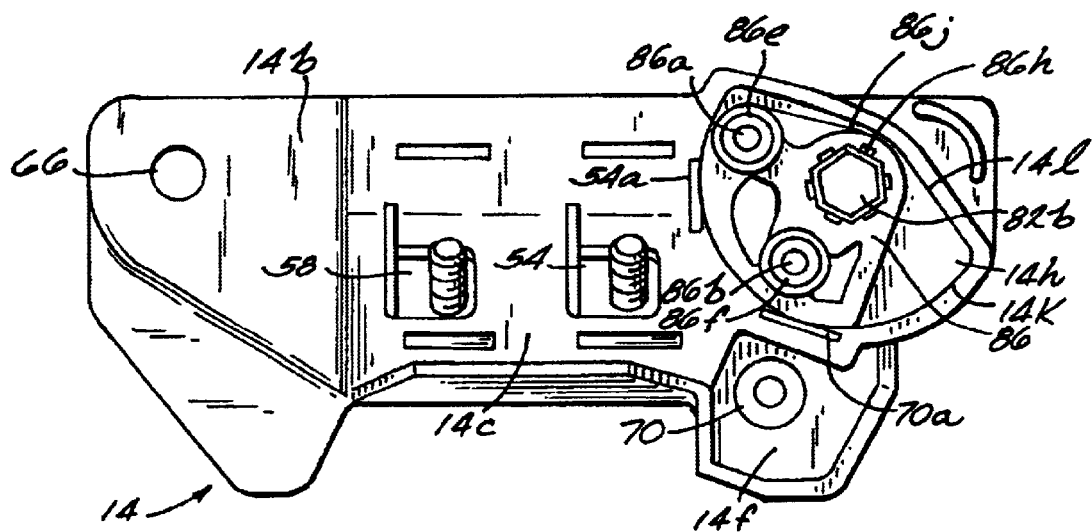

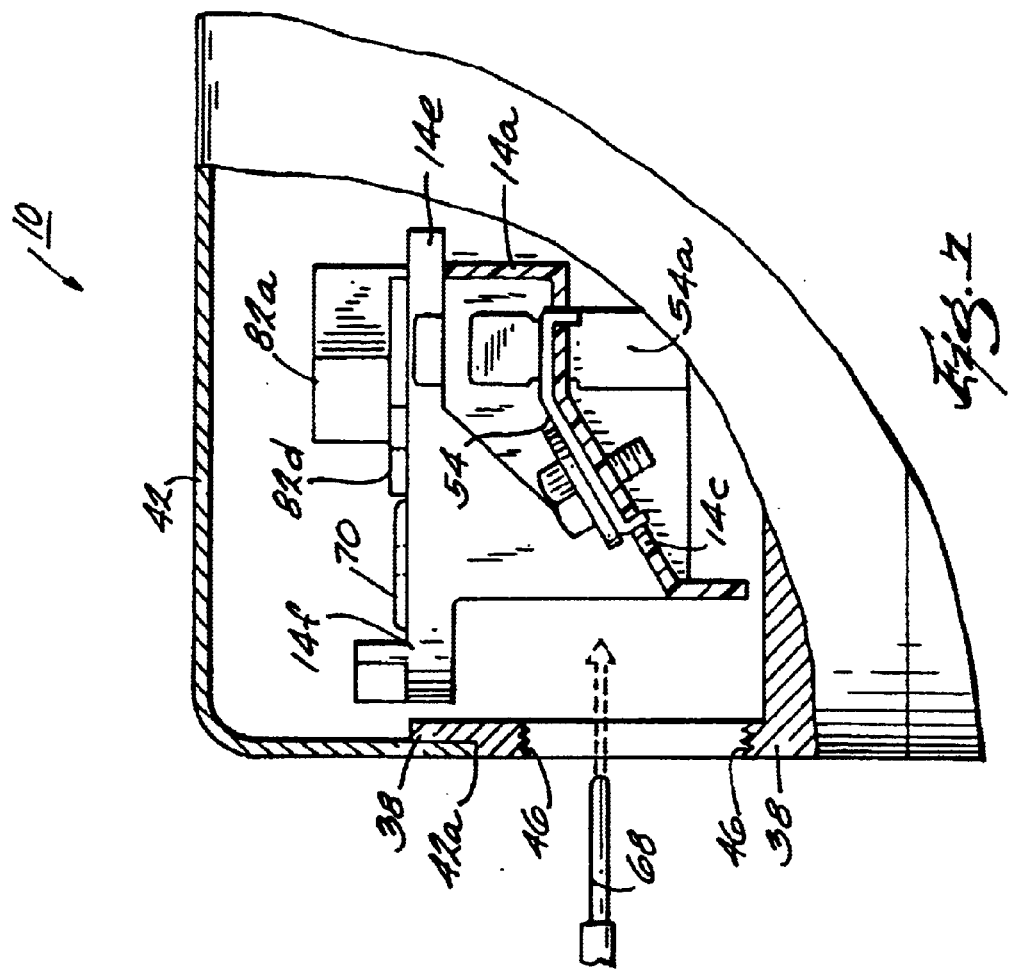
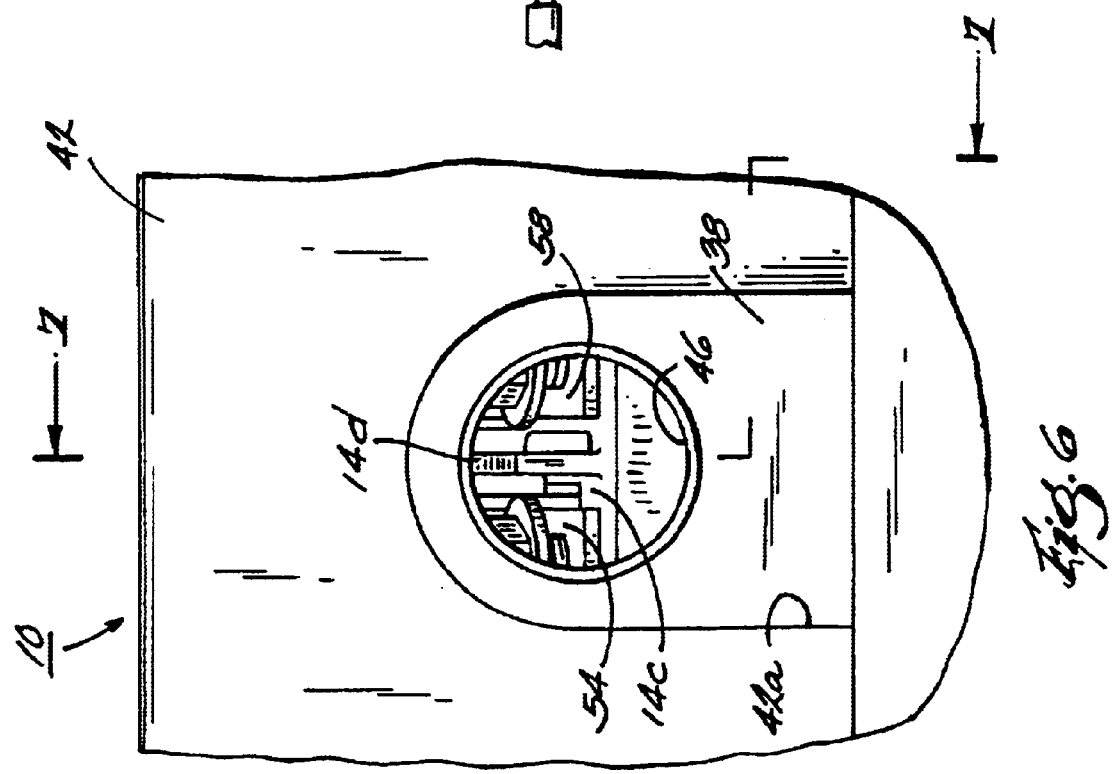

ELECTRIC MOTOR HAVING A TERMINAL BOARD

BACKGROUND OF INVENTION

The present invention relates to electric motors, and more particularly to terminal boards for electric motors.

Various terminal boards have been used to electrically connect electric motors to a power supply for testing and installation purposes. Some of these terminal boards include devices that allow an installer to change or select an operating condition of the electric motor. Nevertheless, a new terminal board that eases testing and installation of the electric motor would be welcomed by those in the art.

SUMMARY OF THE INVENTION

The invention provides a terminal board that eases testing and installation of an electric motor.

In one embodiment, the invention provides an electric motor having a housing, a stator fixed relative to the housing, a shaft rotatable about a motor axis, a rotor supported by the shaft for rotation with the shaft relative to the stator, a terminal board fixed relative to the housing, and first and second electrical terminals supported by the terminal board. The electric motor also includes an operating condition switch including a moveable portion supported by the terminal board, the movable portion being adapted to pivotably rotate about a second axis between a first position corresponding to a first operating condition and a second position corresponding to a second operating condition. At least a portion of the moveable portion substantially remains in a fixed axial position relative to the second axis while pivoting between the first and second positions.

In another embodiment, the invention provides an electric motor having a housing, a stator fixed relative to the housing and including a pair of windings, a shaft rotatable about a motor axis, a rotor supported by the shaft for rotation with the shaft relative to the stator, a terminal board fixed relative to the housing, and first and second electrical terminals supported by the terminal board. The electric motor also includes a voltage selection device including a moveable portion supported by the terminal board, the movable portion being adapted to rotate about a second axis between a first position in which the windings are electrically connected in parallel to provide a first voltage setting and a second position in which the windings are electrically connected in series to provide a second voltage setting. At least a portion of the moveable portion substantially remains in a fixed axial position relative to the second axis while pivoting between the first position and second positions.

In yet another embodiment, the invention provides an electric motor having a housing that defines a conduit receiving opening, which is substantially located in a first plane. The electric motor also has a stator fixed relative to the housing, a shaft rotatable about a motor axis, a rotor supported by the shaft for rotation with the shaft relative to the stator, and a terminal board fixed relative to the housing. The terminal board includes a terminal portion positioned adjacent the conduit receiving opening, which is substantially located in a second plane. The first and second planes form an acute angle. The first and second electrical terminals are at least partially supported by the terminal portion and at least partially positioned within the acute angle. The electric motor is electrically connectable to a power supply via first and second electrical terminals.

BRIEF DESCRIPTION OF DRAWINGS

The present invention is further described with reference to the accompanying drawings, which show an embodiment of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention. Also, it is understood that the phraseology and terminology used herein is for the purpose of description and should not be regarded as limiting. The use of including, comprising, or having and variations thereof herein is meant to encompass the items listed thereafter and equivalents thereof as well as additional items. Unless specified or limited otherwise, the terms mounted, connected, and coupled and variations thereof are used broadly and encompass both direct and indirect mountings, connections, and couplings. Further, connected and coupled are not restricted to physical or mechanical connections or couplings.

FIG. 1 is a perspective view, partially cut away, of an electric motor including a terminal board according to one embodiment of the present invention.

FIG. 2 is a top view of a portion of the electric motor of FIG. 1.

FIG. 3 is a top view of the terminal board of FIG. 1.

FIG. 4 is a bottom view of the terminal board of FIG. 1.

FIG. 6 is a front view of a portion of the electric motor shown in FIG. 1.

FIG. 7 is a sectional view of the portion of the electric motor shown in FIG. 6 taken along line 7—7.

DETAILED DESCRIPTION

Figure 5:
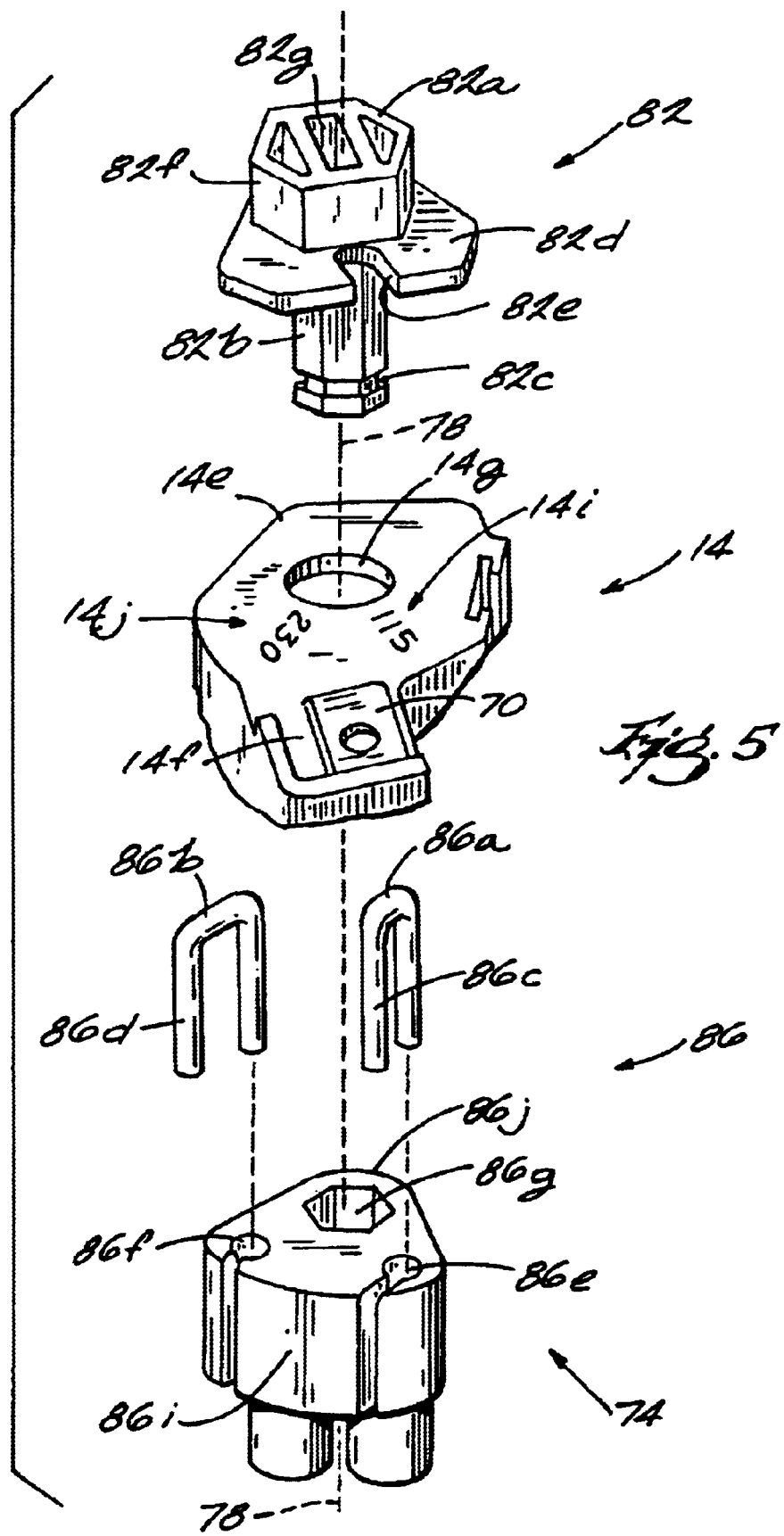
FIG. 5 is an exploded view of a portion of the terminal board of FIG. 1.

Illustrated in FIG. 1 of the drawings is an electric motor 10 including a terminal board 14 according to one embodiment of the invention. The motor 10 includes a housing 18, a stator 22 fixed relative to the housing 118, a shaft 26 rotatable relative to the housing 18 (via one or more bearings) about an axis 30, and a rotor 34 connected to the shaft 26 for rotation therewith relative to the stator 22. The housing 18 includes an end frame 38 and a cover 42 attached thereto. The end frame 38 defines a conduit receiving aperture 46. Winding indicators 47 and 48 (see FIGS. 8 and 9) represent the main stator windings of the motor 10. As is commonly known in the art, the motor 10 is electrically connectable across a power supply 49 (schematically illustrated in FIGS. 8 and 9) via electrical conductors 50. In some embodiments, the electrical conductors 50 are inserted through the conduit receiving aperture 46 and are electrically connected to line terminals 54 and 58 supported on the terminal board 14. The cover 42 protects the terminal board 14 and other components of the motor 10 (e.g., a capacitor, a thermal protector, a starting switch assembly, and the like) during operation of the motor 10. The cover 42 is shown partially cut away in FIG. 1. As shown in FIGS. 6 and 7, the cover 42 includes a cutout 42a sized to provide access to the conduit receiving aperture 46. It should be understood that the present invention is capable of use on other electric motors and the motor 10 is merely shown and described as an example of one such motor.

With reference to FIGS. 2–7, the terminal board 14 includes a backing portion 14a, a base portion 14b, a line terminal portion 14c, a line terminal divider portion 14d, an operating condition selection device portion 14e, and a common terminal portion 14f. The terminal board 14 can be made from any number of suitable materials known to those skilled in the art, but injection molded plastic is particularly well suited for use with the subject invention. In the illustrated embodiment, the terminal board 14 is fixed to the end frame 38 by a screw 62 extending through a hole 66 found in the base portion 14b. In other embodiments, the terminal board 14 may be alternatively constructed and connected to the housing 18.

The line terminals 54 and 58 are conventionally constructed and are at least partially supported on the line terminal portion 14c. As illustrated in FIG. 7, the line terminal portion 14c is angled relative to the conduit receiving aperture 46. In other words, the conduit receiving aperture 46 is substantially located in a first plane and the line terminal portion 14c is substantially located in a second plane while the line terminals 54 and 58 are at least partially positioned within an acute angle formed between the first and second planes. Placement of the line terminals 54 and 58 adjacent and angled relative to the conduit receiving aperture 46 allows for testing of the motor 10 and/or removal of test leads (not shown) while the cover 42 is attached to the end frame 38. Test leads are generally connected to spade terminals of the line terminals 54 and 58 by the motor manufacturer before the cover 42 is attached. Original equipment manufacturers may want to electrically test the motor 10 without test leads or remove the test leads. However, it is inefficient for the original equipment manufacturer to remove the cover 42 to perform these functions. The motor 10 can be electrically tested by inserting probes 68 (schematically illustrated in FIG. 7) that are electrically connected to a power supply through the conduit receiving aperture 46 to contact the line terminals 54 and 58. Such testing saves time and reduces the chance of damage to the internal workings of the motor 10 when the cover 42 is removed. The test leads can also be removed through the conduit receiving aperture 46. A tool such as a screw driver can be inserted through the conduit receiving aperture 46 to pry flag terminals of the test leads off the spade terminals of the line terminals 54 and 58. Removal of the test leads can occur before or after electrical testing of the motor 10. Such removal also saves time and reduces the chance of damage to the internal workings of the motor 10 when the cover 42 is removed. In one embodiment, the line terminal portion 14c is angled to an extent which allows testing of the motor 10 and removal of the test leads through the conduit receiving aperture 46 while still allowing for easy manipulation of screws of the line terminals 54 and 58 when the cover 42 is removed. In the illustrated embodiment, the line terminal portion 14c is angled relative to the conduit receiving aperture 46 by approximately 30 degrees. In other embodiments, the line terminal portion 14c may be angled relative to the conduit receiving aperture 46 by an angle in a range between 15 and 75 degrees. In yet other embodiments, the angle may alternatively vary.

Angling the line terminal portion 14c relative to the remainder of the terminal board 14 lowers the line terminals 54 and 58 adjacent to the conduit receiving aperture 46 while maintaining room between the terminal board 14 and the end frame 38 for necessary connections to the terminal board 14. Although connections to the windings 47 and 48 as discussed further below can be made on the top side (as shown in FIG. 3) of the terminal board 14, placement of the connections on the bottom side (as shown in FIG. 4) of the terminal board 14 allows for reduced confusion during installation of the motor 10. In the illustrated embodiment, the line terminals 54 and 58 are placed close enough together such that the line terminals 54 and 58 are directly accessible through the conduit receiving aperture 46. The line terminal divider portion 14d separates the line terminals 54 and 58 such that conductors 50 attached to the line terminals 54 and 58 do not electrically short.

A common terminal 70 is also supported by the terminal board 14. The common terminal 70 is supported on the common terminal portion 14f. The line terminal 54 and the common terminal 70 each include a contact portion 54a and 70a (see FIG. 4) disposed adjacent the operating condition selection device portion 14e of the terminal board 14.

An operating condition selection device (e.g., a switch), such as a voltage selection device 74 (e.g., a voltage selection switch), includes a movable portion and a stationary portion. The movable portion is supported by the operating condition selection device portion 14e for pivotable rotation about an axis 78. The movable portion is pivotable between a first position corresponding to a first operating condition and a second position corresponding to a second operating condition. For the voltage selection device 70, the windings are electrically connected in parallel to provide a low voltage setting in the first position and are electrically connected in series to provide a high voltage setting in the second position. In one embodiment, the low voltage setting is approximately 115 volts and the high voltage setting is approximately 230 volts. In other embodiments, the low and high voltage settings may vary.

As best shown in FIG. 5, the movable portion of the voltage selection device 74 includes a top portion 82 and a bottom portion 86. The top portion 82 includes an actuation portion 82a, a shaft portion 82b having a recess 82c, and a skirt portion 82d having a window 82e. The actuation portion 82a includes a surface configured for engagement by a tool to pivot the movable portion between the first and second positions. The illustrated actuation portion 82a has a hex head 82f for engagement by a wrench or a nut driver and a screwdriver slot 82g for engagement by a screwdriver. Use of a tool to pivot the movable portion between the first and second positions reduces the chance of an accidental change of the operating condition setting during installation. The bottom portion 86 includes first and second U-shaped conductors 86a and 86b having respective contact portions 86c and 86d, first and second conductor apertures 86e and 86f, a shaft aperture 86g, locking tabs 86h (see FIG. 4) positioned around the bottom of the shaft aperture 86g, and an arcuate surface 86i, and a surface 86j (see FIG. 4). The conductor apertures 86e and 86f are sized to receive the conductors 86a and 86b such that the contact portions 86c and 86d extend slightly past the surface of the arcuate portion 86i.

The stationary portion of the voltage selection device 74 includes the operating condition selection device portion 14e and the contact portions 54a and 70a (see FIG. 4). The operating condition selection device portion 14e includes an aperture 14g (see FIG. 5), a recess 14h (see FIG. 4) in communication with the aperture 14g, and operating condition indicators. In the illustrated embodiment, the indicators include a low voltage setting marking 14i corresponding to 115 volts and a high voltage setting marking 14j corresponding to 230 volts. In other embodiments, other indicators can be utilized.

The top and bottom portions 82 and 86 of the movable portion are assembled by inserting the shaft portion 82b through the aperture 14g and into the shaft aperture 86g. The locking tabs 86h engage the recess portion 82c such that the top portion 82 is fixedly secured to the bottom portion 86. In the illustrated embodiment, the bottom of the shaft portion 82b is chambered for ease of assembly. When assembled, the bottom portion 86 is received in the recess 14h and the window 86e can be aligned with each of the indicators 14i and 14j. The corresponding surfaces of the bottom portion 86 and the recess 14h are made such that the contact portions 86c and 86d are movable to electrically engage the contact portions 54a and 70a in first and second positions as described below. In the illustrated embodiment, as shown in FIG. 4, the arcuate surface 86i engages a first arcuate shaped wall 14k of the recess 14h and the surface 86j engages a second arcuate shaped wall 14l of the recess 14h. The inventors have found that engagement of the surface 86j by the wall 14l enhances the electrical engagement of the contact portions 86c and 86d. In one embodiment, the fit between the bottom portion 86 and the recess 14h establishes the force necessary to pivot the movable portion between the first and second positions. As discussed above, in some embodiments that force requires the use of a tool. The corresponding surfaces of the shaft portion 82b and the aperture 14g are made to allow the movable portion to pivot about the axis 78. The corresponding surfaces of the shaft portion 82b and the shaft aperture 86 are made such that the top and bottom portions 82 and 86 move in unison about the axis 78. Although a generally hexagonal shape is illustrated for the shaft portion 82b and the shaft aperture 86g, other shapes and configurations may be utilized.

In the illustrated embodiment, the entire movable portion remains in a fixed axial position relative to the axis 78 while pivoting between the first and second positions. In other embodiments, parts of the movable portion may move axially (e.g., a push operated rotary switch, a pull operated rotary switches, and the like may be utilized which include some axially moving parts), however, it is preferred that the axially movable parts not be removable. The voltage selection device is intended to provide a one-step operation to change the motor voltage setting between the low and high voltage settings (i.e., no removal or replacement of parts). The inventors have found that removable parts of operating condition selection devices can be damaged or reinstalled incorrectly. The contact portions 86c and 86d of the illustrated embodiment remain electrically connected to the winding 48 while the movable portion pivots between the first and second positions. The inventors have further found that an operating condition selection device that provides rotary function is desirable.

The moveable portion may be made from various materials known to those skilled in the art, but injected molded plastic works well with the principles of the present invention. In one embodiment, the bottom portion 86 is injected molded around portions of the conductors 86a and 86b. In other embodiments, the bottom portion 86 is molded and the conductors 86a and 86b are then disposed thereto.

Figure 8:
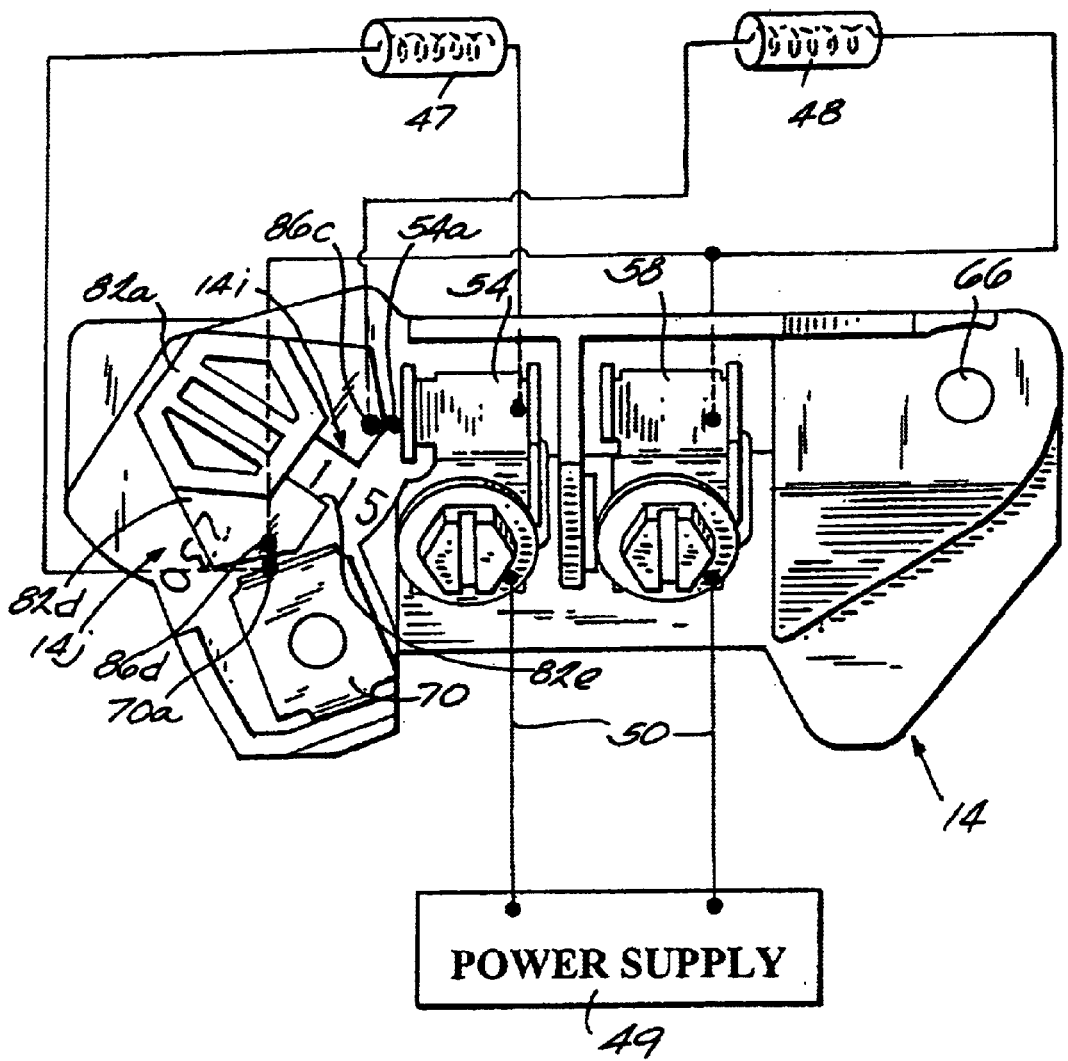
FIG. 8 is a diagrammatic view of the terminal board of FIG. 1 showing portions of the main field winding of the motor connected in parallel across a power supply.
Figure 9:
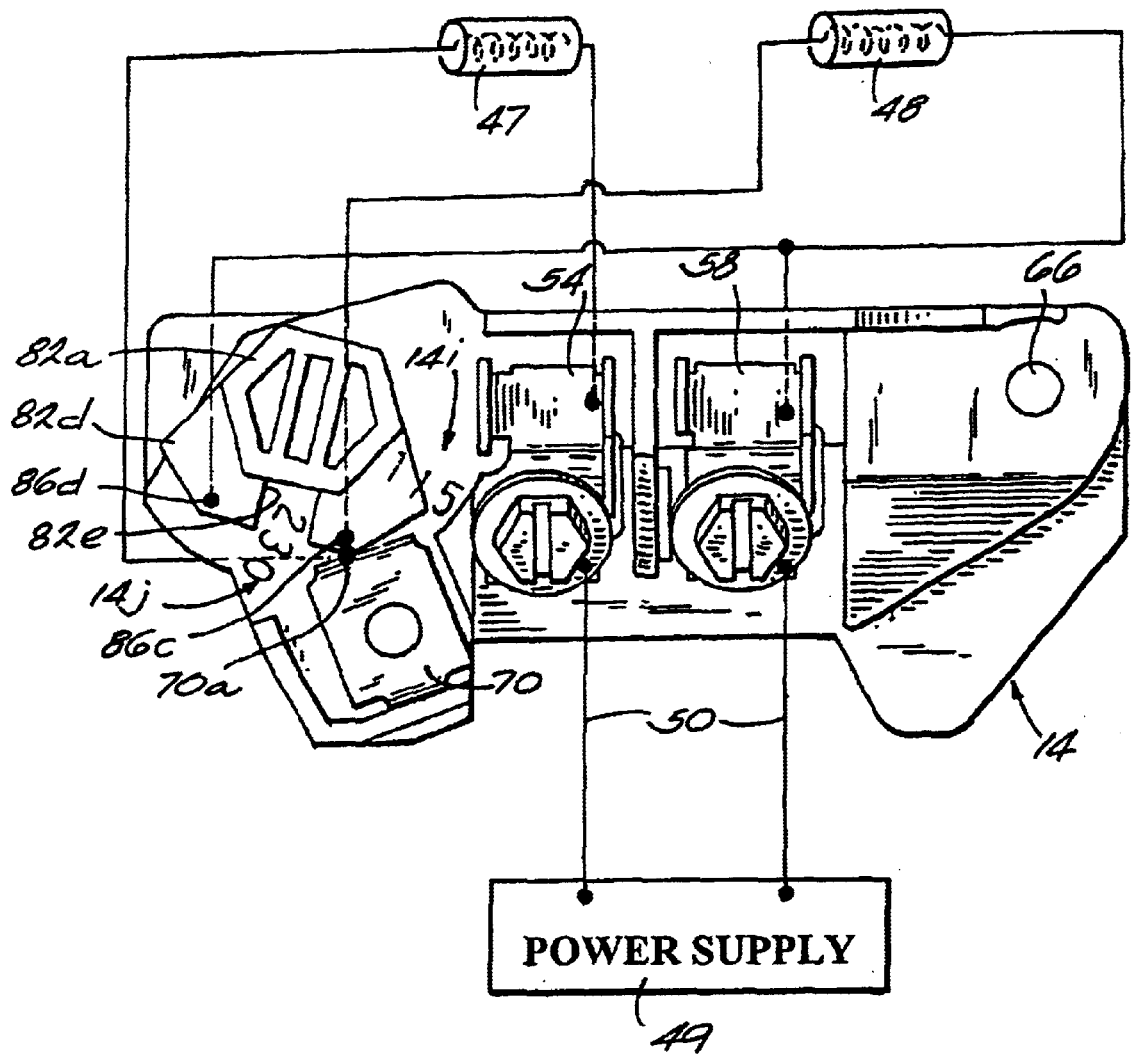
FIG. 9 is a diagrammatic view of the terminal board of FIG. 1 showing portions of a main field winding of the motor connected in series across a power supply.

The terminals 54, 58, and 70 and the conductors 86a and 86b are electrically connected to the windings 47 and 48 and the power source 49 as schematically illustrated in FIGS. 8 and 9 which illustrate the relationships between the contact portions 54a, 70a, 86c, and 86d for a low voltage setting (FIG. 8) and a high voltage setting (FIG. 9). The electrical connections between the windings 47 and 48, the power source, the terminals 54, 58, and 70, and the conductors 86a and 86b are conventionally made.

When it is desirable to connect the winding portions 47 and 48 in parallel across the power supply 49, the voltage selection device 74 is moved to the first position or the low voltage setting as shown in FIG. 8. In the first position, the movable portion is positioned relative to the terminal board 14 such that the contact portion 86c is electrically connected to the contact portion 54a and the contact portion 86d is electrically connected to the contact portion 70a. In the first position, the window 82e is aligned with the indicator 14i to indicate the voltage selection device 74 is in the low voltage setting. The skirt portion 82d is positioned such that only a portion of the indicator 14j is covered. Covering only a portion of the indicator 14j informs an installer or maintenance individual that the motor 10 is operable at one of two motor voltage settings and provides information about the direction of pivotable movement from the first position to the second position. When the motor 10 is to be used at the low voltage setting, the power supply 49 is set to provide the motor 10 a low voltage of approximately 115 volts via the conductors 50 and line terminals 54 and 58.

When it is desirable to connect the winding portions 47 and 48 in series across the power supply 49, the voltage selection device 74 is moved to the second position or the high voltage setting as shown in FIG. 9. In the second position, the movable portion is positioned relative to the terminal board 14 such that the contact portion 86c is electrically connected to the contact portion 70a and the contact portion 86d is not electrically connected to either contact portion 54a and 70a. In the second position, the window 82e is aligned with the indicator 14j to indicate the voltage selection device 74 is in the high voltage setting. The skirt portion 82d is positioned such that only a portion of the indicator 14i is covered. Covering only a portion of the indicator 14i informs an installer or maintenance individual that the motor 10 is operable at one of two motor voltage settings and provides information about the direction of pivotable movement from the second position to the first position. When the motor 10 is to be used at the high voltage setting, the power supply 49 is set to provide the motor 10 a high voltage of approximately 230 volts via the conductors 50 and line terminals 54 and 58.

In the illustrated embodiment, the operating condition selection device portion 14e is raised relative to the remainder of the terminal board 14. The operating condition selection device portion 14e is raised so it is evident to an installer or maintenance individual that, when the cover 42 is removed, the motor 10 is operable at a multitude of operating condition settings. The skirt portion 82d is sized to show at least a portion of each the indicators regardless of where the operating condition selection device 74 is positioned (e.g., in the first position, in the second position, between the first and second positions). Recognition that the motor 10 needs to be set to an operating condition setting may prevent improper operation or failure of the motor 10.

In other embodiments, the voltage selection device can be replaced with other operating condition selection devices for changing any number of operating conditions of an electric motor. For example, in one embodiment a speed selection device is utilized to change the speed of the motor between a low speed setting and a high speed setting. The speed selection device may be configured substantially similar to the voltage selection device and include different indicators (e.g., a HIGH indicator corresponding to the high speed setting and a LOW indicator corresponding to the low speed setting). For a speed selection device, the winding(s) of the motor would need to be wired to provide a multitude of speed settings based on pivotable movement of the speed selection device.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

What is claimed is:

1. An electric motor comprising:

a housing;

a stator fixed relative to the housing;

a shaft rotatable about a motor axis;

a rotor supported by the shaft for rotation with the shaft relative to the stator;

a terminal board fixed relative to the housing;

first and second electrical terminals supported by the terminal board; and an operating condition switch including a moveable portion supported by the terminal board, the movable portion being adapted to pivotably rotate about a second axis between a first position corresponding to a first operating condition and a second position corresponding to a second operating condition, at least a portion of the moveable portion substantially remaining in a fixed axial position relative to the second axis while pivoting between the first and second positions;

wherein at least one of the terminal board and the operating condition switch includes first and second operating condition markings, wherein the first operating condition marking and a portion of the second operating condition marking are visible in the first position, and wherein the second operating condition marking and a portion of the first operating condition marking are visible in the second position.

2. An electric motor according to claim 1 wherein the stator includes a pair of windings, wherein the windings are electrically connected in parallel to provide the first operating condition in the first position, and wherein the windings are electrically connected in series to provide the second operating condition in the second position.

3. An electric motor according to claim 1 wherein the operating condition switch is a voltage selection switch, wherein the first operating condition is a low voltage setting, and wherein the second operating condition is a high voltage setting.

4. An electric motor according to claim 1 wherein the operating switch is a speed selection switch, wherein the first operating condition is a low speed setting, and wherein the second operating condition is a high speed setting.

5. An electric motor comprising:

a housing;

a stator fixed relative to the housing and including a pair of windings;

a shaft rotatable about a motor axis;

a rotor supported by the shaft for rotation with the shaft relative to the stator;

a terminal board fixed relative to the housing;

first and second electrical terminals supported by the terminal board; and a voltage selection device including a moveable portion supported by the terminal board, the movable portion being adapted to pivotably rotate about a second axis between a first position in which the windings are electrically connected in parallel to provide a first voltage setting and a second position in which the windings are electrically connected in series to provide a second voltage setting, at least a portion of the moveable portion substantially remaining in a fixed axial position relative to the second axis while pivoting between the first and second positions;

wherein the movable portion includes a first electrical contact and a second electrical contact, and wherein the first and second electrical contacts are each electrically coupled to one of the windings when the movable portion is pivoting between the first and second positions.

6. An electric motor according to claim 5 wherein the moveable portion includes a first portion and second portion, wherein the terminal board includes an aperture, and wherein the first portion is fixedly secured to the second portion through the aperture.

7. An electric motor according to claim 5 wherein the voltage selection device provides a one-step operation to change the voltage setting between the low and high voltage settings.

8. An electric motor according to claim 5 and further comprising a third electrical terminal supported by the terminal board, wherein the third electrical terminal includes a third electrical terminal contact disposed adjacent to the movable portion, wherein the second electrical terminal includes a second electrical terminal contact disposed adjacent to the movable portion, wherein the first electrical contact contacts the second electrical terminal contact and the second electrical contact contacts the third electrical terminal contact in the first position, and wherein the first electrical contact contacts the third electrical terminal contact in the second position.

9. An electric motor according to claim 5 wherein the movable portion includes a surface configured to receive a tool to pivot the movable portion between the first and second positions.

10. An electric motor according to claim 5 wherein the terminal board and the voltage selection device include respective indicators such that in each of the first and second positions at least some of the respective indicators align themselves to each other.

11. An electric motor according to claim 10, wherein the voltage selection device includes a skirt portion having a window disposed therein, wherein the voltage selection device indicator includes the window, and wherein the terminal board indicators include a low voltage marking and a high voltage marking.

12. An electric motor according to claim 11, wherein the low voltage marking and a portion of the high voltage marking are visible in the first position and the high voltage marking and a portion of the low voltage marking are visible in the second position.

13. An electric motor according to claim 5 wherein the housing includes an end frame and a cover supported by the end frame, wherein the terminal board and a plurality of electrical components are supported by the end frame, wherein at least one of the terminal board and the voltage selection device includes first and second markings, the first and second markings positioned on a surface of the at least one of the terminal board and the voltage selection device that is substantially normal to the motor axis, the first marking corresponding to the low voltage setting and the second marking corresponding to the high voltage setting, and wherein the markings are positioned axially outward in the direction of the cover of a majority of the plurality of electrical components.

14. An electric motor according to claim 5, wherein the housing includes an end frame that defines a conduit receiving opening, the conduit receiving opening being substantially located in a first plane, wherein the terminal board is fixed relative to the end frame and includes a terminal portion positioned adjacent the conduit receiving opening, the terminal portion being substantially located in a second plane, the first and second planes forming an acute angle, and wherein the first and second electrical terminals are at least partially supported by the terminal portion and at least partially positioned within the acute angle.

15. An electric motor comprising:
   a housing having an end frame that defines a conduit receiving opening, the conduit receiving opening being substantially located in a first plane;
   a stator fixed relative to the housing;
   a shaft rotatable about a motor axis, the shaft supported by the end frame;
   a rotor supported by the shaft for rotation with the shaft relative to the stator;
   a terminal board fixed relative to the end frame and having a terminal portion positioned adjacent the conduit receiving opening, the terminal portion being substantially located in a second plane, the first and second planes forming an acute angle; and
   first and second electrical terminals at least partially supported by the terminal portion and at least partially positioned within the acute angle.

16. An electric motor according to claim 15, wherein the acute angle is between 15 and 75 degrees.

17. An electric motor according to claim 15, wherein the acute angle is between 25 and 65 degrees.

18. An electric motor according to claim 15, wherein the housing includes a cover, and wherein the terminal board is disposed within the housing between the end frame and the cover.

* * * * *